United States Patent
Park et al.

(10) Patent No.: US 11,844,158 B2
(45) Date of Patent: Dec. 12, 2023

(54) SYSTEM FOR SINGLE CHANNEL BASED MULTI-FUNCTION LED LAMP DRIVE

(71) Applicants: HYUNDAI MOTOR COMPANY, Seoul (KR); Kia Corporation, Seoul (KR); SL Corporation, Daegu (KR)

(72) Inventors: Choong Seob Park, Suwon-si (KR); So Jeong Kang, Seoul (KR); Jin Hyun Kim, Suwon-si (KR); Seok Hyun Hwang, Gyeongsan-si (KR); Ga Hee Lee, Gyeongsan-si (KR); Chul Sung Lee, Gyeongsan-si (KR)

(73) Assignees: HYUNDAI MOTOR COMPANY, Seoul (KR); KIA CORPORATION, Seoul (KR); SL CORPORATION, Daegi (KR)

( * ) Notice: Subject to any disclaimer, the term of this patent is extended or adjusted under 35 U.S.C. 154(b) by 65 days.

(21) Appl. No.: 17/529,699

(22) Filed: Nov. 18, 2021

(65) Prior Publication Data
US 2023/0072464 A1 Mar. 9, 2023

(30) Foreign Application Priority Data
Aug. 24, 2021 (KR) .......................... 10-2021-0111778

(51) Int. Cl.
*H05B 45/37* (2020.01)
*H05B 45/14* (2020.01)
(Continued)

(52) U.S. Cl.
CPC ........... *H05B 45/37* (2020.01); *B60Q 1/1423* (2013.01); *H05B 45/14* (2020.01); *H05B 47/105* (2020.01); *B60Q 2400/30* (2013.01)

(58) Field of Classification Search
CPC ...... H05B 45/37; H05B 45/14; H05B 47/105; B60Q 1/1423; B60Q 2400/30
See application file for complete search history.

(56) References Cited

U.S. PATENT DOCUMENTS 11,267,391 B1 * 3/2022 Wu ........................ F21S 41/19
11,553,570 B1 * 1/2023 Imanaka ................ H05B 47/18
(Continued)

FOREIGN PATENT DOCUMENTS

KR 10-2022-0048718 A 4/2022

*Primary Examiner* — Andrew J Coughlin
*Assistant Examiner* — Jessica M Apenteng
(74) *Attorney, Agent, or Firm* — MORGAN, LEWIS & BOCKIUS LLP

(57) ABSTRACT

A single channel-based multi-functional light emitting diode lamp driving system includes: first and second light source groups distinguished for each lamp function thereof; a single LED lamp driving module adjusting an input voltage to a voltage required for each lamp function and to apply it to the first and second light source groups; a switching module controlling on or off of the first and second light source groups; and a control module controlling light amounts of the first and second light source groups by performing time-division control on an on or off time of the switching module in conjunction with the LED lamp driving module, wherein the control module is configured to perform time division turn-on control on the first and second light source groups by controlling at least one of a current value applied to the first and second light source groups or a duty ratio thereof in a high-beam passing mode.

13 Claims, 12 Drawing Sheets

(51) Int. Cl.
*B60Q 1/14* (2006.01)
*H05B 47/105* (2020.01)

(56) References Cited

U.S. PATENT DOCUMENTS

| | | | |
|---|---|---|---|
| 2003/0057843 A1* | 3/2003 | Kim | B60Q 1/143 |
| | | | 315/77 |
| 2020/0148096 A1* | 5/2020 | Tomono | B60Q 1/1407 |
| 2022/0117063 A1 | 4/2022 | Park et al. | |

* cited by examiner

SYSTEM FOR SINGLE CHANNEL BASED MULTI-FUNCTION LED LAMP DRIVE

CROSS-REFERENCE TO RELATED APPLICATION

The present application claims priority to Korean Patent Application No. 10-2021-0111778, filed on Aug. 24, 2021, the entire contents of which is incorporated herein for all purposes by this reference.

BACKGROUND OF THE INVENTION

Field of the Invention

The present invention relates to a single channel-based multi-functional light emitting diode (LED) lamp driving system, and more particularly, to a high beam passing control technique in a day mode of a multi-functional LED lamp.

Description of Related Art

In general, a vehicle is provided with various vehicle lamp devices having a lighting function for easily identifying an object positioned around the vehicle during night driving and a signal function for notifying other vehicles or road users of a driving state of the vehicle. For example, among various vehicle lamps, a headlamp, a fog lamp, etc. serve as a lighting function, and a turn signal lamp, a brake lamp, a side lamp, etc. serve as a signal function.

A plurality of LEDs is used as lamps of such a vehicle, and in the case where the plurality of LEDs is to be driven simultaneously, a current deviation occurs when driving at a same voltage due to deviation of each of the LEDs, so that brightness is different from each other.

Accordingly, when driving the plurality of LEDs, a constant current driving method is mostly used rather than a constant voltage driving method. When the brightness needs to be finely adjusted, the constant current driving method may be used.

FIG. 1 schematically illustrates a configuration of a power supply for driving a conventional LED.

Referring to FIG. 1, a conventional multi-functional light-emitting diode (LED) lamp driving system may include an ICU 11, a microcomputer 12, an LED driver 13, and an LED load 14.

The ICU 11 may supply a lamp driving signal to the microcomputer 12 through an intelligent power switch (IPS), and may also supply power to the LED driver 13.

The microcomputer 12 may receive the lamp driving signal from the IPS, and control a constant current through the LED driver 13.

The LED driver 13 may be a DC-DC driving semiconductor, and may be positioned corresponding to each function of a lamp. In the instant case, the LED load 14 may be positioned to be connected to each LED driver.

The LED driver 13 may receive power from the IPS and may receive a control signal from the microcomputer 12, to control a LED constant current and to perform fault diagnosis.

That is, the IPS in the ICU (SJB) may serve to supply the control signal and power of the lamp, and at the same time to detect disconnection and short circuit of a wire. In addition, the ICU 11 may receive failure (Open or Short) information of low beam and turn signal from the microcomputer 12 through a separate Tell-Tale wiring circuit for each lamp function.

The conventional multi-functional LED lamp driving system has a problem in that a system cost increases due to use of the LED driver 13 and the expensive IPS overlapped for each lamp function.

The information included in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing a single channel-based multi-functional light emitting diode (LED) lamp driving system and a method thereof, configured for time-divisionally controlling a plurality of LED lamps on a single-channel basis, and providing an effect of simultaneously turning on daytime running lights and high beams by adjusting a duty ratio and a current value of the daytime running lights and the high beams in a passing mode that performs high beam passing control.

The technical objects of the present invention are not limited to the objects mentioned above, and other technical objects not mentioned may be clearly understood by those skilled in the art from the description of the claims.

Various aspects of the present invention are directed to providing a multi-functional light emitting diode (LED) driving system including: a first light source group and a second light source group distinguished for each lamp function thereof; a single LED lamp driving module configured to adjust an input voltage to a voltage required for each lamp function of the first light source group and the second light source group and to apply the input voltage to the first light source group and the second light source group; a switching module configured to control on or off of the first light source group and the second light source group; and a control module configured to control light amounts of the first light source group and the second light source group by performing time-division control on an on or off time of the switching module in conjunction with the LED lamp driving module, wherein the control module is configured to perform time division turn-on control on the first light source group and the second light source group by controlling at least one of a current value applied to the first light source group and the second light source group or a duty ratio of the first light source group and the second light source group in a high-beam passing mode in which a high-beam signal is inputted in a state where a daytime running lamp by the second light source group is turned on during a daytime.

In various exemplary embodiments of the present invention, the first light source group may perform at least one of a low-beam function, a high-beam function, or a sub-high beam function, and the second light source group may perform a daytime running lamp (DRL) function or a positioning lamp function.

In various exemplary embodiments of the present invention, the control module may control the LED lamp driving module so that a first current value is applied to the second light source group in a daytime mode, and may control the LED lamp driving module so that a second current value which is greater than the first current value is applied to the first light source group in a night mode.

In various exemplary embodiments of the present invention, the control module may control the LED lamp driving module so that a third current value which is greater than the second current value is applied to the second light source group in the high-beam passing mode.

In various exemplary embodiments of the present invention, the control module may control the third current value not to exceed a maximum output current value or a limit current value of the LED lamp driving module.

In various exemplary embodiments of the present invention, the control module may perform turn-on control on the second light source group at a first duty ratio in a daytime mode, may perform turn-on control on the first light source group at a second duty ratio which is smaller than the first duty ratio in a night mode, and may perform turn-on control on the second light source group at a third duty ratio which is equal to or smaller than a value obtained by subtracting the second duty ratio from the first duty ratio.

In various exemplary embodiments of the present invention, the control module may perform turn-on control on the first light source group and the second light source group at a same duty ratio, as a duty ratio in the night mode, in the high-beam passing mode.

In various exemplary embodiments of the present invention, the control module may perform turn-on control on the first light source group at a fourth duty ratio which is smaller than the second duty ratio in the high-beam passing mode, and performs turn-on control on the second light source group at a fifth duty ratio which is equal to or smaller than a value obtained by subtracting the fourth duty ratio from the first duty ratio.

In various exemplary embodiments of the present invention, the control module may determine a current value applied to the first light source group in the high-beam passing mode and a fourth duty ratio thereof so that a current area using a current value applied to the first light source group in the night mode and the second duty ratio is similar to a current area in the high-beam passing mode within a predetermined range.

In various exemplary embodiments of the present invention, the control module may determine a current value applied to the second light source group in the high-beam passing mode and a fifth duty ratio thereof so that a current area using a current value applied to the second light source group in the daytime mode and the first duty ratio is similar to a current area in the high-beam passing mode within a predetermined range.

In various exemplary embodiments of the present invention, the control module may determine a current value applied to the second light source group by applying a duty ratio in the night mode so that a current area of the second light source group in the high-beam passing mode is similar to a current area of the second light source group in the day mode within a predetermined range.

In various exemplary embodiments of the present invention, the control module when the current value applied to the second light source group exceeds a maximum output current value or a limit current value of the LED lamp driving module, may control the current value applied to the second light source group not to exceed the maximum output current value or the limit current value of the LED lamp driving module by reducing a duty ratio of the first light source group compared to the duty ratio in the night mode and increasing a duty ratio of the second light source group.

In various exemplary embodiments of the present invention, the control module when the current value applied to the second light source group does not exceed a maximum output current value or a limit current value of the LED lamp driving module, may perform time division turn-on control on the first light source group and the second light source group by use of the duty ratio in the night mode and the current value applied to the second light source group that does not exceed the maximum output current value or the limit current value of the LED lamp driving module.

According to the present technique, it is possible to time-divisionally control a plurality of LED lamps on a single-channel basis, and provide an effect of simultaneously turning on daytime running lights and high beams by adjusting a duty ratio and a current value of the daytime running lights and the high beams in a passing mode that performs high beam passing control.

Furthermore, various effects which may be directly or indirectly identified through the present specification may be provided.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
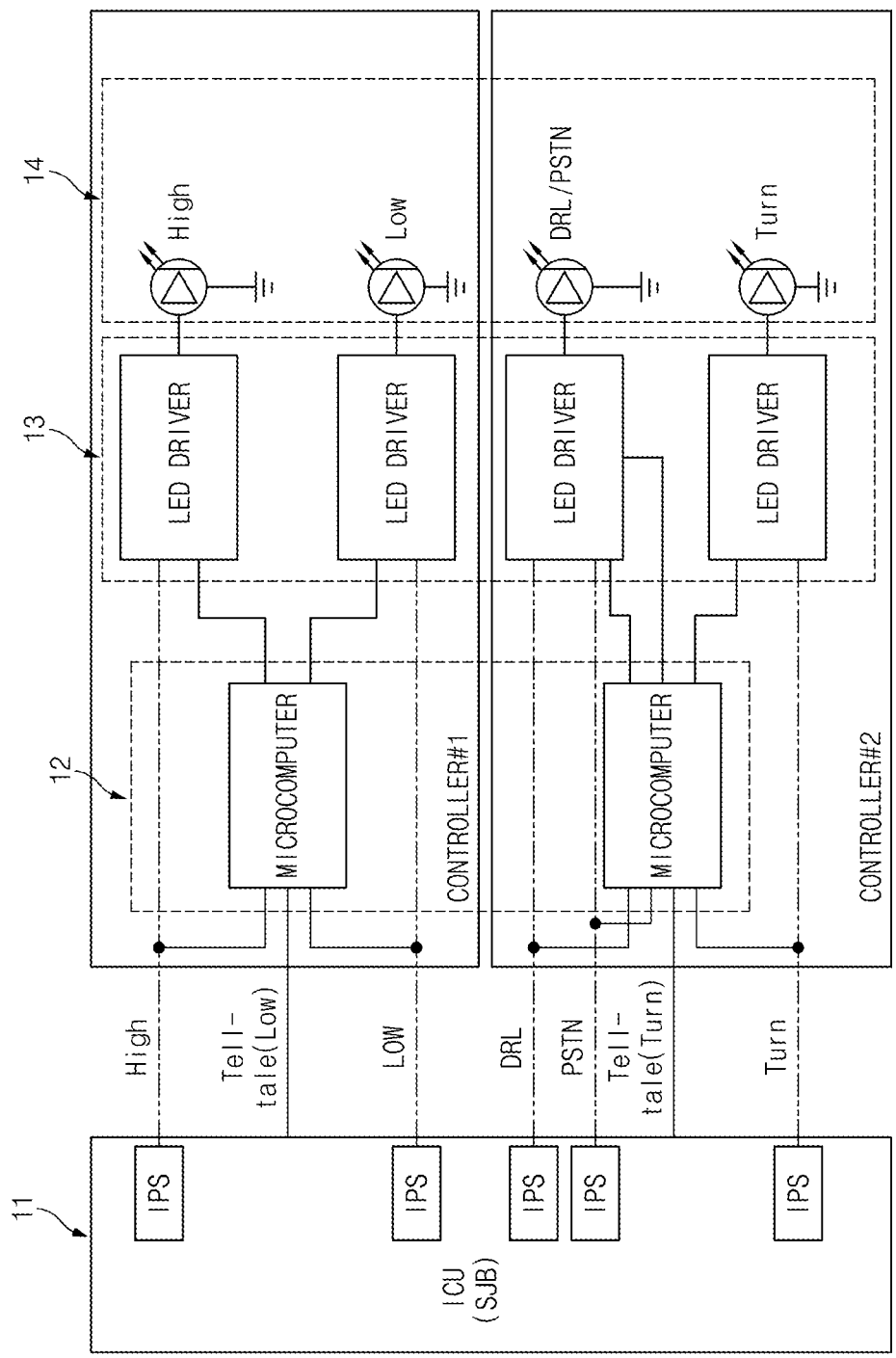
FIG. 1 schematically illustrates a configuration of a power supply for driving a conventional LED.

It may be understood that the appended drawings are not necessarily to scale, presenting a somewhat simplified representation of various features illustrative of the basic principles of the present invention. The specific design features of the present invention as included herein, including, for example, specific dimensions, orientations, locations, and shapes will be determined in part by the particularly intended application and use environment.

DETAILED DESCRIPTION

Reference will now be made in detail to various embodiments of the present invention(s), examples of which are illustrated in the accompanying drawings and described below. While the present invention(s) will be described in conjunction with exemplary embodiments of the present invention, it will be understood that the present description is not intended to limit the present invention(s) to those exemplary embodiments. On the other hand, the present invention(s) is/are intended to cover not only the exemplary embodiments of the present invention, but also various alternatives, modifications, equivalents and other embodiments, which may be included within the spirit and scope of the present invention as defined by the appended claims.

Hereinafter, some exemplary embodiments of the present invention will be described in detail with reference to exemplary drawings. It should be noted that in adding reference numerals to constituent elements of each drawing, the same constituent elements have the same reference numerals as possible even though they are indicated on different drawings. Furthermore, in describing exemplary embodiments of the present invention, when it is determined that detailed descriptions of related well-known configurations or functions interfere with understanding of the exemplary embodiments of the present invention, the detailed descriptions thereof will be omitted.

In describing constituent elements according to various exemplary embodiments of the present invention, terms such as first, second, A, B, (a), and (b) may be used. These terms are only for distinguishing the constituent elements from other constituent elements, and the nature, sequences, or orders of the constituent elements are not limited by the terms. Furthermore, all terms used herein including technical scientific terms have the same meanings as those which are generally understood by those skilled in the technical field to which various exemplary embodiments of the present invention pertains (those skilled in the art) unless they are differently defined. Terms defined in a generally used dictionary shall be construed to have meanings matching those in the context of a related art, and shall not be construed to have idealized or excessively formal meanings unless they are clearly defined in the present specification.

Hereinafter, various exemplary embodiments of the present invention will be described in detail with reference to FIG. 2 to FIG. 7.

A head lamp includes multi-functional (High, Low, Turn, DRL, Fog, etc.) lamps, and specifically have functions of a low beam, a daytime running lamp (DRL, hereinafter referred to as DRL), a positioning lamp (tail lamp, hereinafter referred to as PSTN), and a sub-high beam. The low beam and high beam are to secure forward visibility of a driver, and the DRL turns on automatically when a vehicle is started and driving, regardless of a switch operation of a user and whether a driving time is day or night to prevent traffic accidents by promoting mutual safety between vehicles in a foggy and humid country. The PSTN is an indicator light provided at a front portion of the vehicle.

Conventionally, there is no need to distinguish between a high beam mode and a passing beam mode by providing an LED driver for each LED lamp function rather than a single channel, while according to various exemplary embodiments of the present invention, the high beam mode and the passing beam mode may be distinguished depending on time division control of a multi-functional LED lamp based on the single channel, and a current and a duty ratio may be adjusted for each mode.

That is, according to various exemplary embodiments of the present invention, for a multi-functional LED lamp applied to the headlamp of the vehicle, a single LED lamp driver is used to control the on/off and light quantity of multi-function LED lamps based on time division control, and a configuration for changing and controlling a current value and a duty ratio applied to main light sources (LOW and HIGH) and the daytime running lights (DRL) by recognizing a passing signal during high beam passing in the daytime mode (DRL ON) is disclosed.

Figure 2:
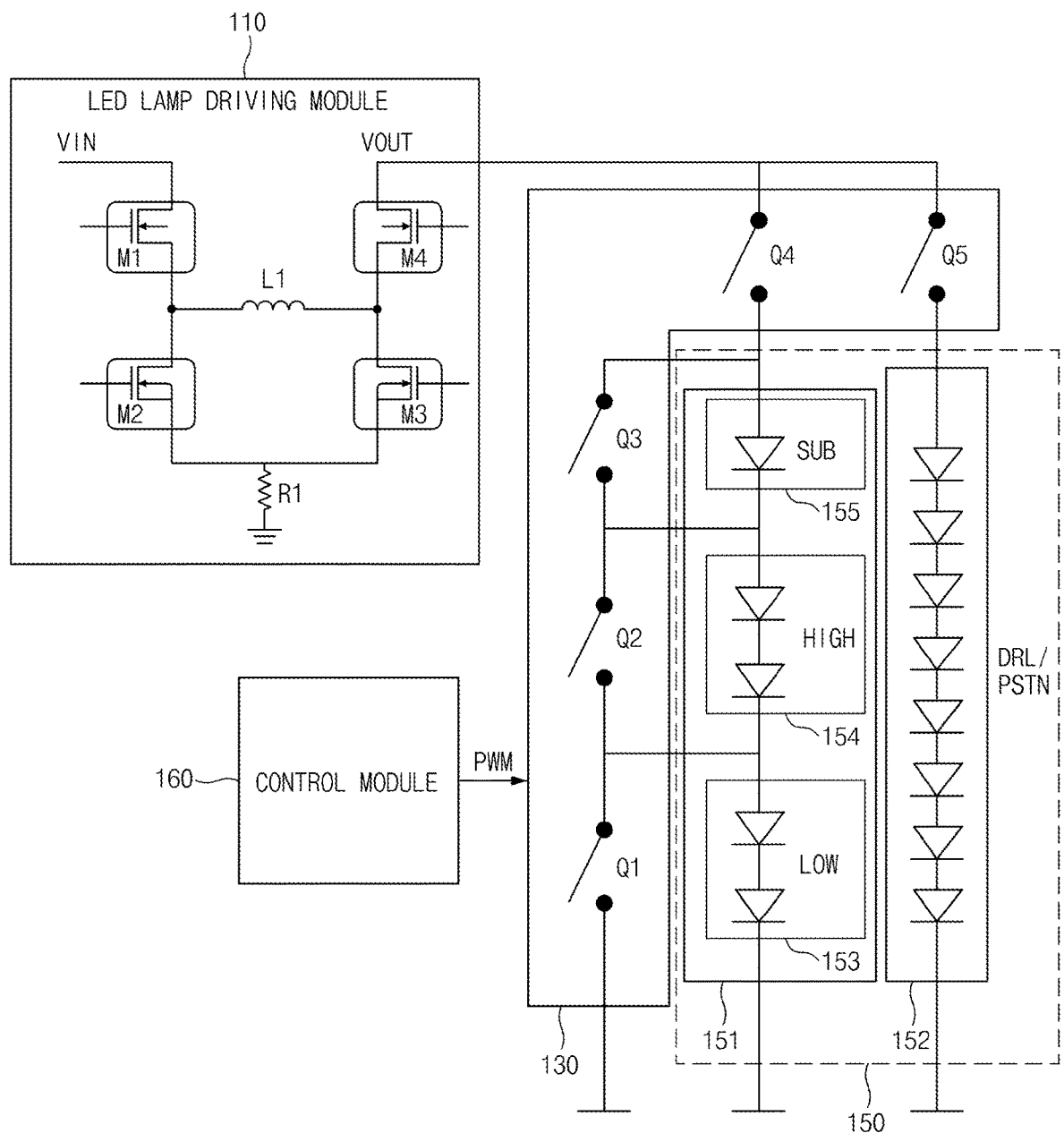
FIG. 2 illustrates a block diagram showing a configuration of a single channel-based multi-functional LED lamp driving system according to various exemplary embodiments of the present invention.

FIG. 2 illustrates a block diagram showing a configuration of a single channel-based multi-functional LED lamp driving system according to various exemplary embodiments of the present invention.

The multi-functional LED lamp driving system according to the exemplary embodiment of the present invention may be implemented in a headlamp inside a vehicle. In the instant case, the multi-functional LED lamp driving system may be integrally formed with internal control units of the vehicle, or may be implemented as a separate device to be connected to control units of the vehicle by a separate connection means.

Referring to FIG. 2, the multi-functional LED lamp driving system may include an LED lamp driving module 110, a switching module 130, an LED load 150, and a control module 160.

The LED lamp driving module 110 adjusts (steps up or reduces) an input voltage, which is a vehicle battery voltage, to a voltage required for each function and supply it to the LED load 150 when turning on or off a lamp of a specific function among multi-functional lamps or adjusting an amount of light.

The LED lamp driving module 110 may control a plurality of lamps in a single configuration by utilizing a high-speed switching (DC-DC) LED driving semiconductor. The LED lamp driving module 110 may increase or decrease the voltage depending on a voltage which is required for each function of the light-emitting diode (LED) lamp. For example, among multi-functions, when the DRL function is on, an input voltage may be reduced and provided to the lamp performing the DRL function, when the high-beam function is on, the input voltage may be boosted and provided to the high-beam function LED lamp, and when the low beam function is turned on, the voltage may be increased or decreased depending on a level of the input voltage to provide the LED lamp performing the low beam function.

The LED lamp driving module 110 may drop or boost an input voltage VIN depending on a driving mode of the headlamp to output it to the LED load 150. In the instant case, the LED load 150 includes a first light source group 151 and a second light source group 152, the first light source group 151 includes LED groups 153, 154, and 155, and each of the LED groups 153, 154, and 155 of the first light source group 151 and the second light source group 152 may implement a multi-functional LED lamp driving mode.

The multi-functional LED lamp driving mode may be divided into a DRL mode, a high beam mode, a low beam mode, a passing beam mode, a PSTN mode, and the like.

To the present end, the LED lamp driving module 110 may include transistors M1, M2, M3, and M4, an inductor L1, and a resistor R1.

When the driving mode of the headlamp is the DRL mode, the LED lamp driving module 110 may buck the voltage to output it to the second light source group 152 that performs the DRL function. For example, when the input voltage has a range of 9 to 16 V (vehicle battery voltage), the voltage is reduced to 6 V for lighting the DRL to output it. To the present end, the transistor M4 is always on and the M3 is off, and when a clock cycle starts, the transistor M2 is turned on, and a current in the inductor L1 is reduced. During a rest of the clock cycle, the transistor M2 is turned off, and the transistor M1 is turned on again, so that the current in the inductor L1 may be charged.

When the driving mode of the headlamp is the high-beam mode, the LED lamp driving module 110 may boost the voltage to output it to the LED group 154 performing the high-beam function. For example, when the input voltage has the range of 9 to 16 V, which is the vehicle battery voltage, the voltage may be boosted to a total of 2 8V to light the LED groups 153, 154, and 155, and to output it to the LED load 150. To the present end, the transistor M1 is always on and the transistor M2 is always off, and when the clock cycle starts, the transistor M3 is turned on to charge the input current in the inductor L1. Thereafter, during the rest of the clock cycle, when the transistor M3 turns off and the transistor M4 turns on, a current charged in inductor L1 decreases.

Furthermore, when the driving mode of the headlamp is the low-beam mode, the LED lamp driving module 110 may buck or boost the input voltage depending on the input voltage level to output it to the LED group 153 that performs the low beam function. For example, when the input voltage has the range of 9 V to 16 V, the voltage may be boosted or bucked to 12 V for driving in the low beam mode. To the present end, all switches of the transistors M1 to M4 may operate depending on a switching frequency.

The switching module 130 includes a plurality of switches Q1, Q2, Q3, Q4, and Q5 that are turned on or off by the control module 160.

The switches Q1, Q2, and Q3 are connected in series between the switch Q4 and a ground voltage terminal, and the switches Q1, Q2, and Q3 may be connected in parallel to the LED groups 153, 154, and 155, respectively.

The switches Q4 and Q5 are connected in parallel between the output terminal of the LED lamp driving module 110 and the ground voltage terminal. Furthermore, output terminals of the switches Q4 and Q5 may be respectively connected to the first light source group 151 and the second light source group 152.

The switch Q5 may adjust an amount of light of the second light source group 152 by changing the duty ratio. In the instant case, when the first light source group 151 is turned on, the second light source group 152 may be turned off, and when the second light source group 152 is turned on, the first light source group 151 may be turned off.

The LED load 150 may include a plurality of LED strings that each emit light by receiving DC power from the LED lamp driving module 110. The LED load 150 of FIG. 1 may be configured in parallel with the first light source group 151 and the second light source group 152.

The first light source group 151 includes LED groups 155, 154, 153 operating for at least one of SUB, HIGH, or LOW functions, and the second light source group 152 has a structure in which a plurality of LED elements configured for operating for a DRL or PSTN function are connected in series. In the instant case, each of the LED groups 154 and 153 may include one or more LED elements connected in series, or may be formed to include a single LED element.

In the first light source group 151, the LED groups 155, 154, and 153 are connected in series, to be controlled to be turned on or off by on or off of the switching module 130, and the second light source group 152 may be configured by serially connecting a plurality of LED elements performing the DRL or PSTN function.

For LED control that requires simultaneous control among the first light source group 151 and the second light source group 152, the control module 160 divides and controls each switch Q1 to Q5 of the switching module 130 for a short time (e.g., 5 ms, which is a time when a person does not recognize on or off), achieving an effect that the first light source group 151 and the second light source group 152 appear to be turned on at the same time. In the instant case, the LED groups 153, 154, and 155 of the first light source group 151 may be sequentially turned on from an LED element having a largest duty rate.

Table 1 below shows an example of LED voltage levels for each headlamp function and switch operations.

TABLE 1

| Headlamp function | LED voltage | Switch operation | | | | |
|---|---|---|---|---|---|---|
| | | Q1 | Q2 | Q3 | Q4 | Q5 |
| Low | 12 V | OFF | ON | ON | ON | OFF |
| High | 10 V | ON | OFF | ON | ON | OFF |
| Sub high | 6 V | ON | ON | OFF | ON | OFF |
| DRL/PSTN | 6 V | — | — | — | OFF | ON |

Referring to Table 1, the switches Q1, Q2, and Q3 are function switches connected to in series, and the switches Q1, Q2, and Q3 controls current application to the LED groups 153, 154, and 155 of the SUB, HIGH, and LOW functions, respectively. The switches Q1, Q2, and Q3 are respectively connected in parallel to the LED groups 153, 154, and 155, to perform a bypass function. In addition, the respective switches Q1, Q2, and Q3 may control amounts of light of the LED groups 153, 154, and 155 by changing duty ratios thereof. When all of the switches Q1, Q2, and Q3 are closed, that is, when they are all turned on, a current flows to the ground voltage terminal through the switches Q1, Q2, and Q3, and thus no current is supplied to the first light source group 151, allowing the LED groups 153, 154, and 155 to be all turned off.

On the other hand, the switches Q4 and Q5 may be enable switches, and may not be turned on at the same time. That is, the first light source group 151 and the second light source group 152 may not be turned on simultaneously.

Accordingly, when the switch Q1 is off and the switches Q2 and Q3 are on in a state where the switch Q5 is on and the switch Q4 is on, a current flows to LED group 153 of the LOW function to turn on the LED group 153. Furthermore, when the switch Q2 is off and the switches Q1 and Q3 are on in a state where the switch Q5 is off and the switch Q4 is on, a current flows to LED group 154 of the LOW function to turn on the LED group 154.

Furthermore, when the switch Q3 is off and the switches Q1 and Q2 are on in a state where the switch Q5 is off and the switch Q4 is on, a current flows to LED group 155 of the SUB function to turn on the LED group 155.

As illustrated in FIG. 2, output terminals of the switches Q4 and Q5 connected in parallel may be connected to the first light source group 151 and the second light source group 152, respectively.

The switch Q5 may adjust an amount of light of the second light source group 152 by changing the duty ratio. In the instant case, when the first light source group 151 is turned on, the second light source group 152 may be turned off, and when the second light source group 152 is turned on, the first light source group 151 is turned off. The control module 160 may process a signal transferred between constituent elements of the multi-functional LED lamp driving system. The control module 160 may be, e.g., an electronic control unit (ECU), a micro controller unit (MCU), or other subcontrollers mounted in the vehicle.

The control module 160 may perform time division control on the and off of the switching module 130 to control the LED load 150. The control module 160 may control one cycle of an outputted PWM signal by dividing it by a specific duty (Duty).

In the instant case, the control module 160 controls the second light source group 152 to be turned off when the first light source group 151 is turned on, and controls the first light source group 151 to be turned off when the second light source group 152 is turned on. The control module 160 controls no current to flow in the second light source group 152 when the first light source group 151 is selected.

The first light source group 151 may include a plurality of LED groups for each function, and the control module 160 may control the switching module 130 to sequentially turn on from a group having a largest duty rate among the LED groups.

The control module 160 may set a duty rate of the first light source group to be longer than that of the second light source group 152. That is, the duty rate of the first light source group is different from that of the second light source group 152. Since the high-beam function and the low-beam function of the first light source group 151 require a higher amount of current than the DRL or PSTN, the duty rate of the first light source group is set to be longer than the lighting ratio of the second light source group 152 to provide a necessary current.

The control module 160 may determine an output current value applied to the first light source group 151 or the second light source group 152 based on the duty ratio of the first light source group 151 or the second light source group 152 and a maximum output current value.

The control module 160 turns on or off the switches Q1, Q2, Q3, Q4, and Q5 through time division control.

That is, when the switch Q5 is on and the other switches Q1 to Q4 are off, the LED lamp driving module provides a voltage of e.g., 6 V, for the PSTN or DRL to the second light source group 152 such that the second light source group 152 is turned on. Accordingly, when the switch Q4 turns on, the switch Q5 turns off, the switch Q1 turns off, and the other switches Q2 and Q3 turn on, the second light source group 152 turns off and the first LED group 153 turns on to perform the low-beam function. In the instant case, the LED lamp driving module 110 outputs an output voltage of 12 V for turn on the first LED group 153.

When an on state of the switch Q4 and an off state of the switch Q5 are maintained in a state where the first LED group 153 is turned on and the switch Q2 is off and only the switch Q3 is on in a state where the switch Q1 off, the second LED group 154 is turned on in a state where the first LED group 153 is turned on, to simultaneously perform the high-beam function and the low-beam function. In the instant case, the LED lamp driving module 110 outputs an output voltage of 22 V to turn on the first LED group 153 and the second LED group 154.

Then, when the on state of the switch Q4 and the off state of the switch Q5 are maintained, and the switches Q1, Q2, and Q3 are all off in a state where the first LED group 153 and the second LED group 154 are turned on, the first LED group 153, the second LED group 154, and the third LED group 155 are all turned on, to simultaneously perform the low-beam function, the high-beam function, and the sub-high beam function. In the instant case, the LED lamp driving module 110 outputs an output voltage of 28 V to turn on the first LED group 153, the second LED group 154, and the third LED group 155.

The first LED group 153 is turned on first, then the second LED group 154 is turned on, and then the third LED group 155 is turned on, to turn off each of the switches Q1, Q2, and Q3 of the switching module 130 for each function in order, so that an off time of each switch is different, but an on time is the same.

The first light source group 151 and the second light source group 152 may have different duty ratios, and an output current applied to each light source group may be determined depending on a duty ratio as shown in Equation 1 below.

$$\text{LED current} = \text{STRING output current maximum value} \times \text{duty ratio} \quad \text{(Equation 1)}$$

In the instant case, the control module 160 controls the switches Q4 and Q5 respectively provided at upper ends of the first light source group 151 and the second light source group 152 such that the first light source group and the second light source group are not turned on simultaneously.

Furthermore, the control module 160 may communicate with the LED lamp driving module 110 to perform current control and failure determination, and may perform a fail-safe action depending on the failure determination.

The control module 160 may determine that the LED load 150 is in the off state when an output current value outputted from the single LED lamp driving module 110 is 50% or less of a target current value. For example, when the LED group 153 performing the low-beam function is turned off, the output voltage of the LED lamp driving module 110 may become very large and the output current may become low, and it may be determined whether or not the LED is off based on whether there is the current output.

The control module 160 may determine whether a short circuit occurs by checking the voltage difference between opposite ends of the LED groups 153, 154, and 155 for each function. For example, when the voltage difference between opposite ends of the LED group 154 performing the high-beam function is small than a predetermined voltage (e.g., 2V), it may be determined that the LED group 154 is short-circuited.

Accordingly, when a failure of the light-emitting diode (LED) load 150 is determined, the control module 160 may bypass the LED elements by operating the remaining LED elements except for the LED elements that cannot be operated due to the failure. For example, when a failure occurs in the LED group 153 performing the low-beam function, the remaining LED groups 154 and 155 excluding the LED group 153 may be operated.

Accordingly, according to various exemplary embodiments of the present invention, it is possible to drive a multi-functional LED using a single channel, i.e., a single LED lamp driving module, and to control turn-on of a plurality of LEDs by performing time division control on the switching module 130.

Figure 3A:
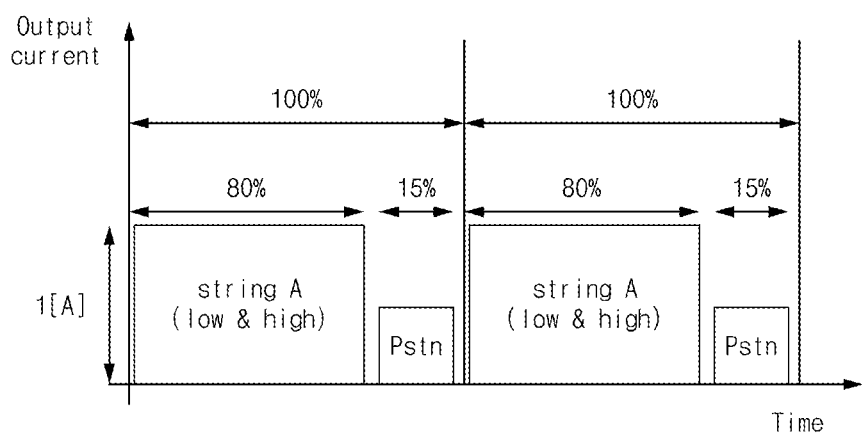
FIG. 3A, FIG. 3B and FIG. 3C each illustrate an example of each driving mode during time division control of a multi-functional LED lamp driving system according to various exemplary embodiments of the present invention.
Figure 3B:
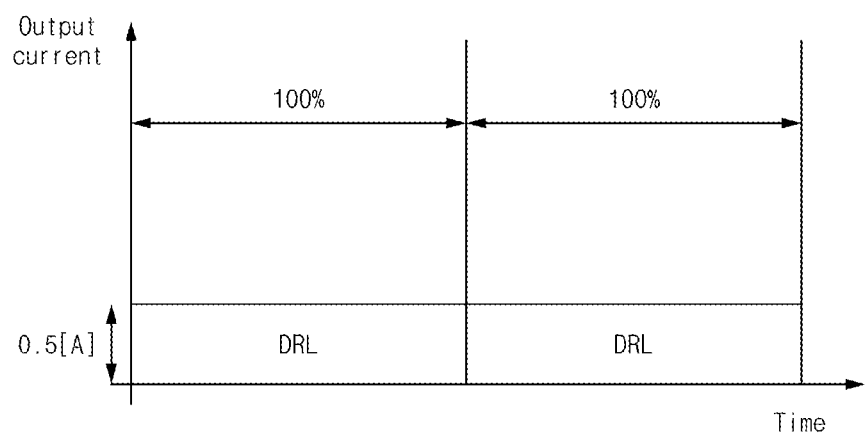
Figure 3C:
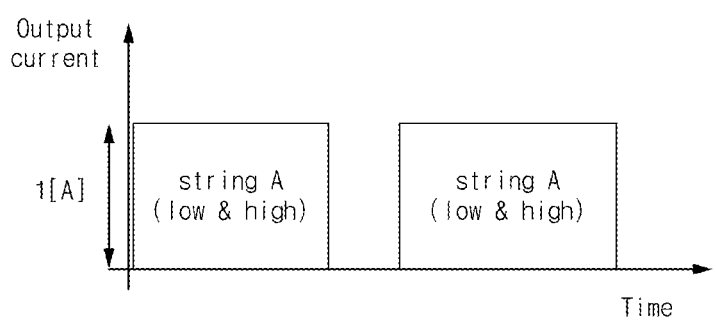

In the case of performing time-division control on a multi-functional LED based on a single channel as described above, it is impossible to provide an effect of simultaneously turning on the low beam or the high beam and the daytime running lamp (DRL) during the high beam passing operation in the daytime mode (DRL). FIG. 3A, FIG. 3B and FIG. 3C each illustrate an example of each driving mode during time division control of a multi-functional LED lamp driving system according to various exemplary embodiments of the present invention. Referring to FIG. 3A, when time division control is performed on a multi-functional LED group based on a single channel, a low beam or a high beam and a PSTN may be divided at a predetermined ratio in a night mode to perform time division turn-on. Furthermore, referring to FIG. 3B, a daytime running lamp may be operated in a daytime mode. However, as illustrated in FIG. 3C, during the passing operation in the day mode, only the low beam or the high beam is turned on, but the daytime running lamp cannot be turned on together. In the instant case, as illustrated in FIG. 3A and FIG. 3C, a current (e.g., 1 A) applied during high beam passing in the night mode and the day mode is the same.

Accordingly, according to various exemplary embodiments of the present invention, the current and the duty ratio may be adjusted to provide an effect of simultaneously turning on the low beam or the high beam and the daytime running lamp (DRL) during the high beam passing operation in the day mode.

Figure 4A:
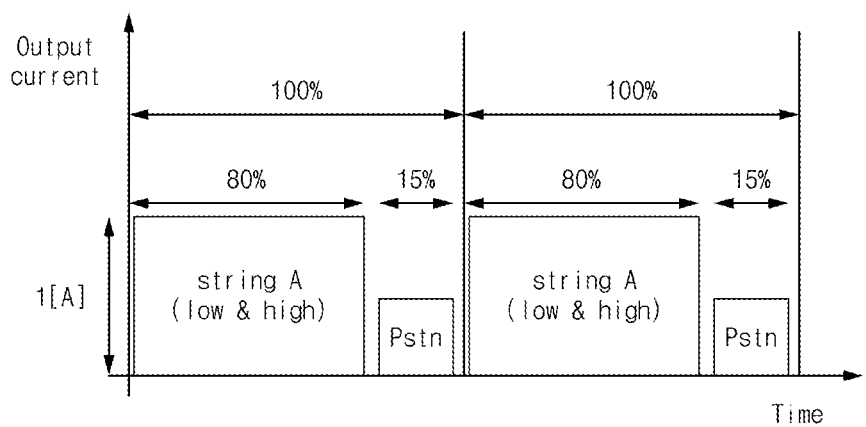
FIG. 4A, FIG. 4B and FIG. 4C each illustrate an example of each driving mode during time division control of a multi-functional LED lamp driving system according to various exemplary embodiments of the present invention.
Figure 4B:
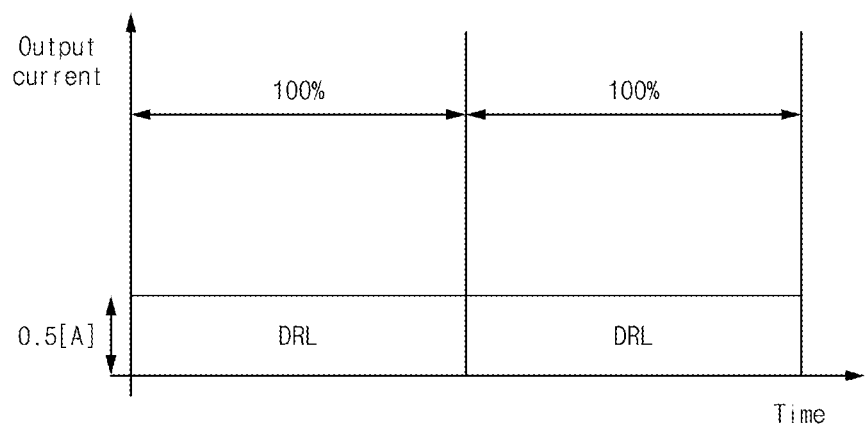
Figure 4C:
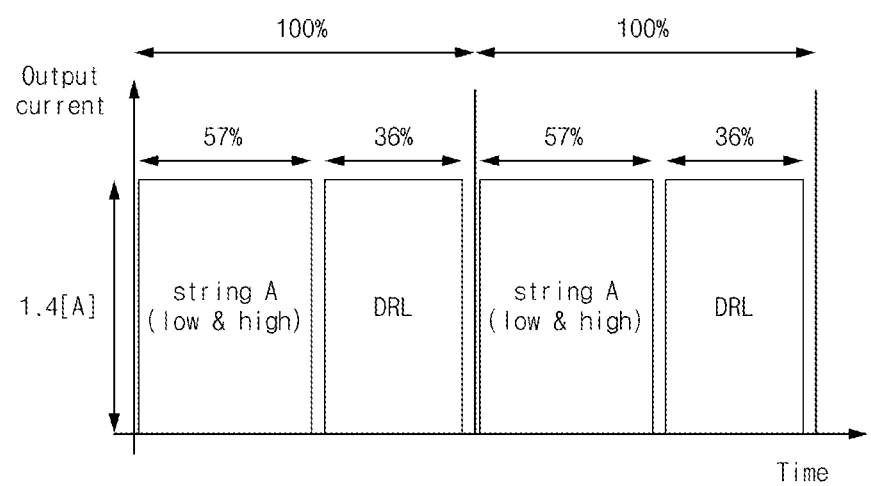

FIG. 4A, FIG. 4B and FIG. 4C each illustrate an example of each driving mode during time division control of a multi-functional LED lamp driving system according to various exemplary embodiments of the present invention.

Referring to FIG. 4A, when the control module 160 performs time division control on a multi-functional LED group based on a single channel, a low beam or a high beam and a PSTN may be divided at a predetermined ratio in a night mode to perform time division turn-on. Furthermore, referring to FIG. 4B, a daytime running lamp may be operated in a daytime mode.

Referring to FIG. 4C, when passing the high beam in the daytime mode, the control module 160 may recognize the passing signal and adjust a current and a duty ratio of the main light source (Low or High) and the daytime running light (DRL), providing an effect of simultaneously turning on the main light source (Low or High) and the daytime running light (DRL). In the instant case, it may be seen that the control module 160 outputs a first current (e.g., 0.5 A) when only the DRL is turned on in the daytime mode of FIG. 4B, and outputs a second current (e.g., 1 A) in the night mode of FIG. 4A, outputs a third current (e.g., 1.4 A) when passing the high beam in the daytime mode of FIG. 4C, and increases a peak current of the main light source when passing the high beam in the daytime mode.

That is, as illustrated in FIG. 4A, the control module 160 may set the current applied to the first light source group 151 as a second current value (e.g., 1 A) in the night mode, and may control a duty ratio of the switch Q4 to a second duty ratio (e.g., 80%). Accordingly, the duty ratio of the switch Q5 may be set a third duty ratio (e.g., 15%). That is, the control module 160 may perform turn-on control on the first light source group 151 at the second duty ratio (e.g., 80%) which is smaller than the first duty ratio (e.g., 100%) in the night mode, and may perform turn-on control on the second light source group 152 at the third duty ratio (e.g., 15%) which is smaller than or equal to a value obtained by subtracting the second duty ratio (e.g., 80%) from the first duty ratio (e.g., 100%).

The control module 160 may set a current applied to the second light source group 152 as a first current value (e.g., 0.5 A) which is smaller than the second current value in the daytime mode in which the DRL operates, and may control a duty ratio of the switch Q5 to the first duty ratio (e.g., 100%).

The control module 160 may recognize the passing mode when a HIGH BEAM signal is inputted while the DRL signal is inputted. That is, the control module 160 may recognize the passing mode when the DRL is 1 (ON) and the HIGH BEAM is 1 (ON). Accordingly, the control module 160 may set the current applied to the second light source group 152 as a third current value (e.g., 1.4 A) which is greater than the first current value and the second current value, and may set the duty ratio of the switch Q5 as a fifth duty ratio (e.g., 36%) which is smaller than the first duty ratio. Furthermore, the control module 160 may set the current applied to the first light source group 151 as the third current value (e.g., 1.4 A), and may control the duty ratio of the switch Q4 to a fourth duty ratio (e.g., 57%) which is smaller than the second duty ratio.

That is, the control module 160 may perform turn-on control on the first light source group 151 at the fourth duty ratio (e.g., 57%) which is smaller than the second duty ratio (e.g., 80%) in the passing mode, and may perform turn-on control on the, second light source group 152 at the fifth duty ratio (e.g., 36%) which is smaller than or equal to a value obtained by subtracting the fourth duty ratio (e.g., 57%) from the first duty ratio (e.g., 100%).

Accordingly, as illustrated in Equation 2 below, an area of a product of a current value and a duty ratio of the high beam and the low beam in the night mode and an area of the product of a current value and a duty ratio of the high beam and the low beam in the passing mode become similar within a predetermined range. Accordingly, the amount of light of the first light source group 151 becomes the same at a night time and at a daytime during high-beam passing, so that there is no sense of heterogeneity when viewed from the outside.

Furthermore, as shown in Equation 3, it may be seen that a current area of the DRL in the daytime mode and a current area of the DRL in the passing mode are similar. Accordingly, even when the high beam passes in the daytime mode, light quantity of the daytime running lamp (DRL) is maintained.

Second current value(1 A)×second duty ratio(80%) third current value(1.4 A)×fourth duty ratio (57%)     (Equation 2)

First current value 0.5 A×first duty ratio(100%)third current value(1.4 A)×fifth duty ratio(36%)     (Equation 3)

The control module 160 determines whether a sum of a predetermined duty ratio of the daytime running lamp and the duty ratio of the high beam is 100 or less when both the high beam signal performing the high-beam function and the DRL signal performing the daytime running lamp function are inputted, and may control lighting of the daytime running lamp and the high beams depending on the predetermined duty ratio of the daytime running lamp and the duty ratio of the high beam when the sum of the predetermined duty ratio of the daytime running lamp and the duty ratio of the high beam is 100 or less.

On the other hand, when the sum of the predetermined duty ratio of the daytime running lamp and the duty ratio of the high beam exceeds 100, the control module 160 recomputes the duty ratio of the daytime running lamp and the duty ratio of the high beam such that the sum becomes 100 or less, and recalculates the current value according to the recomputed duty ratios. Accordingly, the control module 160 controls the turn-on of the first light source group 151 and the second light source group 152 according to the recomputed duty ratios and the recalculated current value.

Hereinafter, a high-beam passing control method during time division control of a multi-functional LED lamp according to various exemplary embodiments of the present invention will be described in detail with reference to FIG. 5.

Hereinafter, it is assumed that the control module 160 of FIG. 2 performs a process of FIG. 5. Furthermore, in the description of FIG. 5, it may be understood that operations referred to as being performed by a device are controlled by the control module 160.

Figure 5:
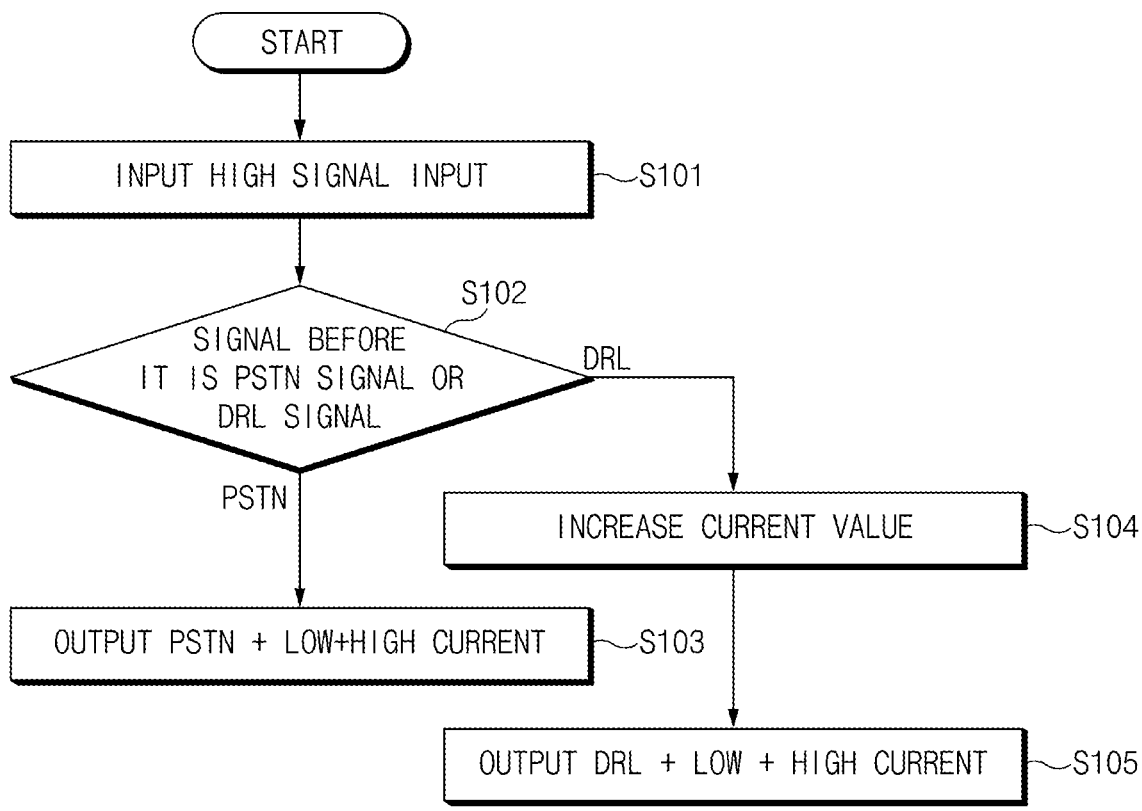
FIG. 5 illustrates a flowchart showing a high-beam passing control method during time division control of a multi-functional LED lamp according to various exemplary embodiments of the present invention.

Referring to FIG. 5, in a state in which a high-beam signal (HIGH signal) is inputted (S101), the control module 160 determines whether an input signal is a PSTN signal or a DRL signal before the high-beam signal (HIGH signal) is inputted (S102).

When the high beam signal is inputted after the PSTN signal is inputted, the control module 160 time-divisionally turns on the second light source group 152 of the PSTN function and the LED groups 153 and 154 of the high beam and low beam functions through time division control (S103). In the instant case, when a PSTN signal is inputted in a state where the high beam signal is inputted, a current having a second current value may be applied to a high beam or low beam, a duty ratio of the high beam or low beam may be controlled 80%, and a duty ratio of the PSTN may be controlled to 15%.

When the high beam signal and the DRL signal are inputted, i.e., when the high beam signal is inputted after the DRL signal is inputted, the control module 160 increases the current outputted from the LED lamp driving module 110 to the second light source group 152 that performs the DRL function (S104), and time-divisionally turns on the second light source group 152 with the DRL function and the LED groups 153 and 154 with the high-beam and low-beam functions through time division control (S105). In the instant case, current values and duty ratios of the second light source group 152 having the DRL function and the LED groups 153 and 154 having the high beam and low beam functions may be controlled by distinguishing between a vehicle with a large DRL consumption current and a vehicle with a small DRL consumption current.

Next, an example of time-division turn-on will be described in detail with reference to FIG. 6 and FIG. 7.

Figure 6:
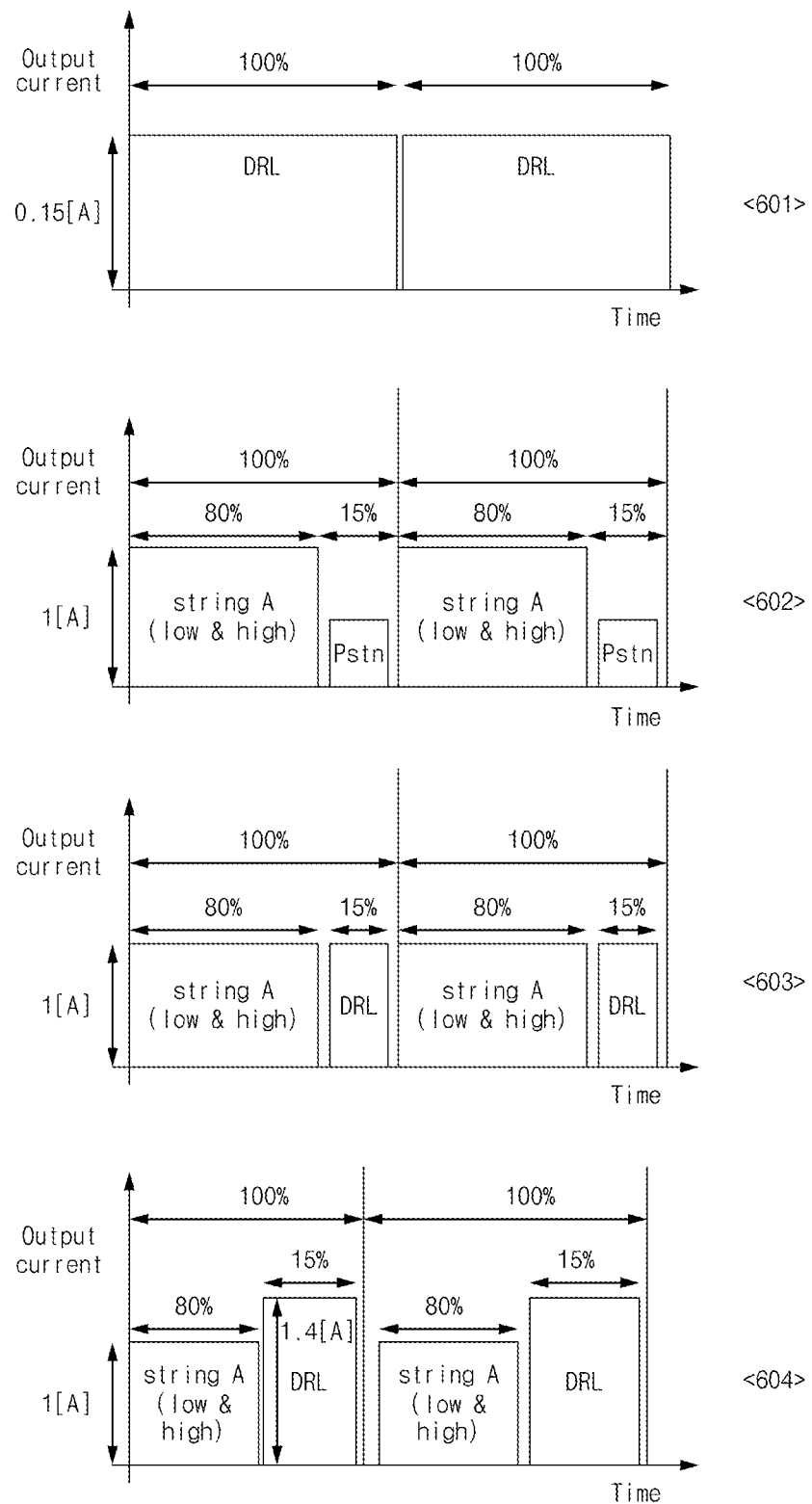
FIG. 6 illustrates an example of high-beam passing control when a duty ratio of a high-beam and a low-beam in a night mode is applied during time division control of a multi-functional LED lamp according to various exemplary embodiments of the present invention.

FIG. 6 illustrates an example of high-beam passing control in a passing mode in which duty ratios of a high beam and a low beam are controlled in a same way as in a night mode during time division control of a multi-functional LED lamp according to various exemplary embodiments of the present invention. For example, an example of high-beam passing control in a case where a size of the LED lamp is small and an amount of current consumed is small, as in a small vehicle, will be disclosed.

A view 601 of FIG. 6 shows an example of a case where a current area of the DRL of the vehicle is 0.15 A*100%=15, and a current which is required for turning on the DRL is low.

A view of 602 shows a turn-on ratio of the high beam and the low beam and the PSTN when a high-beam signal is inputted after the PSTN signal is inputted. That is, when the high-beam signal is inputted in the night mode, the duty ratio of the high beam may be 80%, a current value of 1 A may be applied to the high beam, and the PSTN may be turned on with a duty ratio of 15% of the remaining 20%.

On the other hand, in the passing mode where the high-beam signal is inputted after the DRL signal is inputted, as shown in a view 603, the high beam is turned on at a duty ratio of 80% as in the night mode, a current of 1 A is applied, and the DRL is turned on with a duty ratio of 15% of the remaining 20%, and in the instant case, as shown in the view 601, the current area is 15 when the DRL of a current vehicle is turned on at 100%, and thus when the DRL is turned on at 15%, a current which is applied such that the current area becomes 15 may be increased from 0.15 to 1 A.

However, in the case where the current area is greater than 15 when the DRL of the current vehicle is turned on at 100%, the current value may be increased to be more than 1 A such that the current area becomes greater than 15 when the DRL is turned on at 15%, and in the instant case, as shown in a view 604, it may be set so as not to exceed a lower current value among a maximum output current value of the LED lamp driving module 110 (LED driver) or a limit current value of the LED. In the instant case, the maximum output current value of the LED lamp driving module 110 (LED driver) or the limit current value of the LED may be a value which is determined by a chip manufacturer. For example, the view 604 shows a case where the maximum output current value of the LED lamp driving module 110 (LED driver) or the limit current value of the LED is 1.4 A.

Accordingly, in the case where a current value of the DRL is increased when passing the high beam in a vehicle with a low current required for turning on the DRL, it is possible to provide an effect that the DRL and the high beam are turned on at the same time by controlling the duty ratios of the low beam and the high beam to be the same as in the night mode and controlling the current applied to the DRL.

Figure 7:
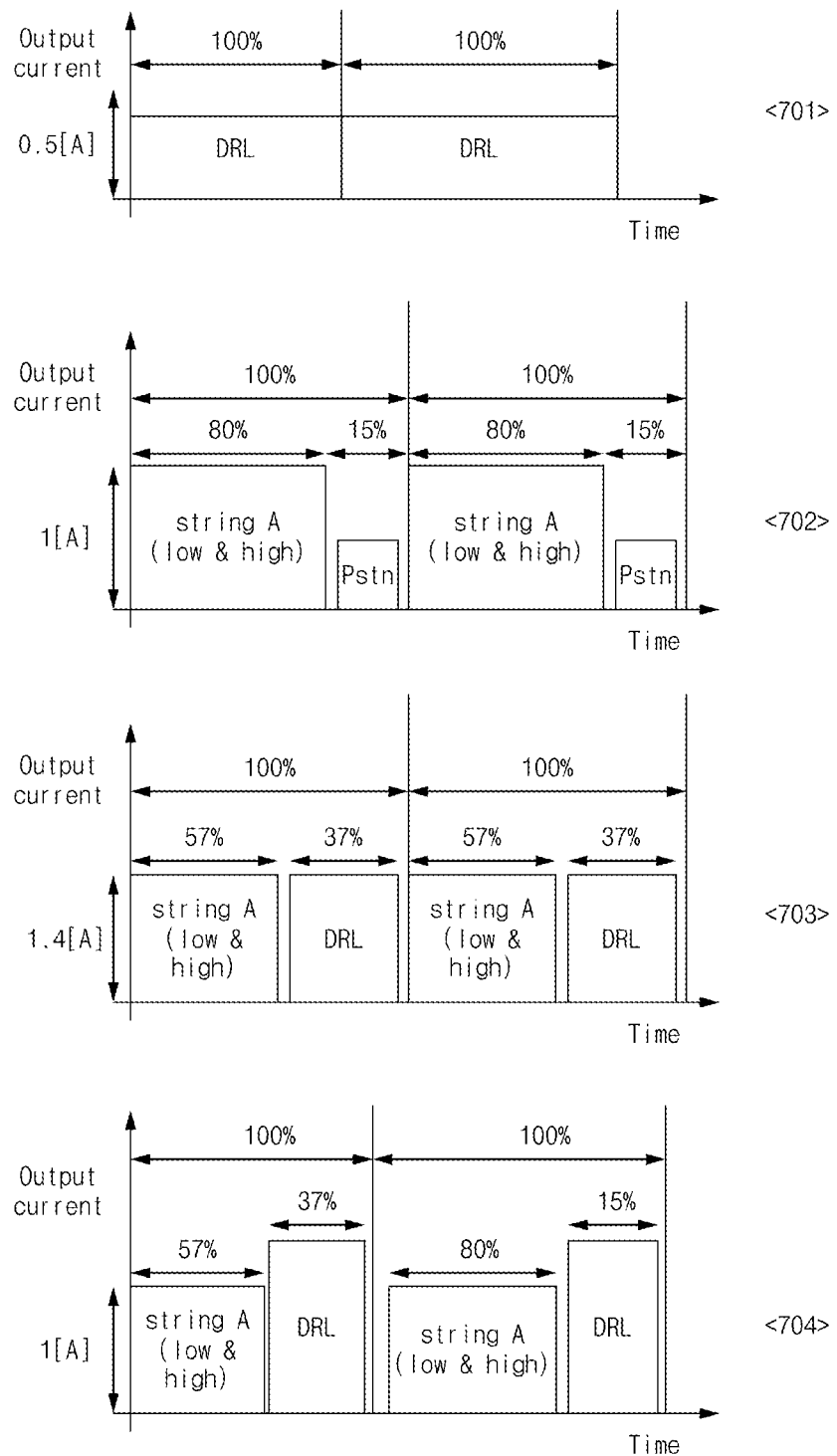
FIG. 7 illustrates an example of performing high-beam passing control by adjusting a duty ratio of a high beam and a low beam during time division control of a multi-functional LED lamp according to various exemplary embodiments of the present invention.

FIG. 7 illustrates an example of high-beam passing control in which a duty ratio must be controlled differently from a night mode during time division control of a multi-function LED lamp according to various exemplary embodiments of the present invention. For example, an example of high-beam passing control in a case where a size of the LED lamp is large and an amount of current consumed is large, as in a large vehicle, will be disclosed.

A view 701 shows an example of a case where a current area of the DRL of the vehicle is 0.5 A*100%=50, and a current which is required for turning on the DRL is high.

A view of 702 shows a turn-on ratio of the high beam and the low beam and the PSTN when a high-beam signal is inputted after the PSTN signal is inputted. That is, in the night mode, the high beam and the low beam are turned on at a duty ratio of 80%, and a current of 1 A is applied.

On the other hand, in the passing mode where the high-beam signal is inputted after the DRL signal is inputted, the high beam is turned on at a duty ratio of 80% as in the night mode, a current of 1 A is applied, and the DRL is turned on with a duty ratio of 15% of the remaining 20%, and in the instant case, as shown in the view 701, the current area is 50 when the DRL of a current vehicle is turned on at 100%, and thus when the DRL is turned on at 15%, a current which is applied such that the current area becomes 15 should become 50. However, even when the current value applied to the DRL is increased to 1 A in a state where the duty ratio of the DRL is 15%, the current area becomes 15, which is small than 50, so a light amount of the DRL is weakened. Accordingly, it is necessary to increase the current value or adjust the duty ratio of the high beam such that the current area of the DRL becomes 50.

However, when the current value is increased such that the current area of the DRL becomes 50, the current value becomes 3.3 A for the current area to be 50 in a state where the duty ratio is 15%. However, the current value of the DRL should be set below the maximum output current value of the LED driver or the limit current value of the LED (e.g., 1.4 A).

Accordingly, when the current value of the DRL is increased to 1.4 A, the duty ratio of the DRL must be 37% for the current area to be 50. As a result, since the duty ratio of the DRL becomes 37%, the duty ratio of the high beam may be determined as 57%, which is equal to or smaller than 63%, which is obtained by subtracting 37% from 100%.

That is, a view 703 illustrates an example of allowing the current area of the high beam to be similar to that in the night mode, increasing the duty ratio of the DRL to 37%, and setting the current applied to the DRL to be 1.4 A by reducing the duty ratio of the high beam to 57% and increasing the current applied to the high beam to 1.4 A. It may be seen that the current area of the DRL becomes 51.8 (=1.4 A*37%), which is similar to the current area of 50 when the DRL is turned on at 100% in the view 701.

A view 704 illustrates an example where the duty ratio of the high beam is 57%, the current value is 1 A, the duty ratio of the DRL is 37%, and the current value is 1.4 A.

In the instant case, the duty ratio and the current value illustrated in FIG. 6 and FIG. 7 are one example and are not limited thereto, and may be changed depending on the maximum output current of the LED lamp driving module 110 or the limit current of the LED.

Accordingly, according to various exemplary embodiments of the present invention, the current area of the second light source group 152 in the passing mode is calculated based on the current area of the second light source group 152 in the daytime mode and the duty ratio thereof in the night mode. That is, the current applied to the second light source group 152 is increased such that the current area of the second light source group 152 based on the duty ratio in the night mode is similar to the current area of the second light source group 152 in the daytime mode.

In the instant case, according to various exemplary embodiments of the present invention, when the current value applied to the second light source group 152 exceeds the maximum output current value or the limit current value of the LED lamp driving module 110, the current value applied to the second light source group 152 may be controlled not to exceed the maximum output current value or the limit current value of the LED lamp driving module 110 by reducing the duty ratio of the first light source group 151 compared to the duty ratio in the night mode and increasing the duty ratio of the second light source group 152. Accordingly, it is possible to provide an effect that the first light source group 151 and the second light source group 152 are simultaneously turned on without a decrease in the amount of light in the passing mode.

Furthermore, according to various exemplary embodiments of the present invention, when the current value applied to the second light source group 152 does not exceed the maximum output current value or the limit current value of the LED lamp driving module 110, time division lighting control of the first light source group 151 and the second light source group 152 may be performed by applying the duty ratios of the first light source group 151 and the second light source group 152 in the night mode as they are and applying a current value applied to the second light source group 152, which does not exceed the maximum output current or limit current of the LED lamp driving module 110.

Accordingly, it is possible to provide an effect of turning on the DRL and the high beam at the same time when performing time division control for driving a multi-functional LED lamp based on a single channel by recognizing a high beam signal which is applied in the daytime mode as a high beam passing signal and changing and controlling the current applied to the main light sources (high beam, low beam) and the daytime running light (DRL) and the duty ratio thereof.

Accordingly, according to various exemplary embodiments of the present invention, it is possible to time-divisionally control a multi-functional LED group based on a single channel, and it is possible to implement the passing mode in the daytime mode without configuring a separate channel for driving the LED.

Figure 8:
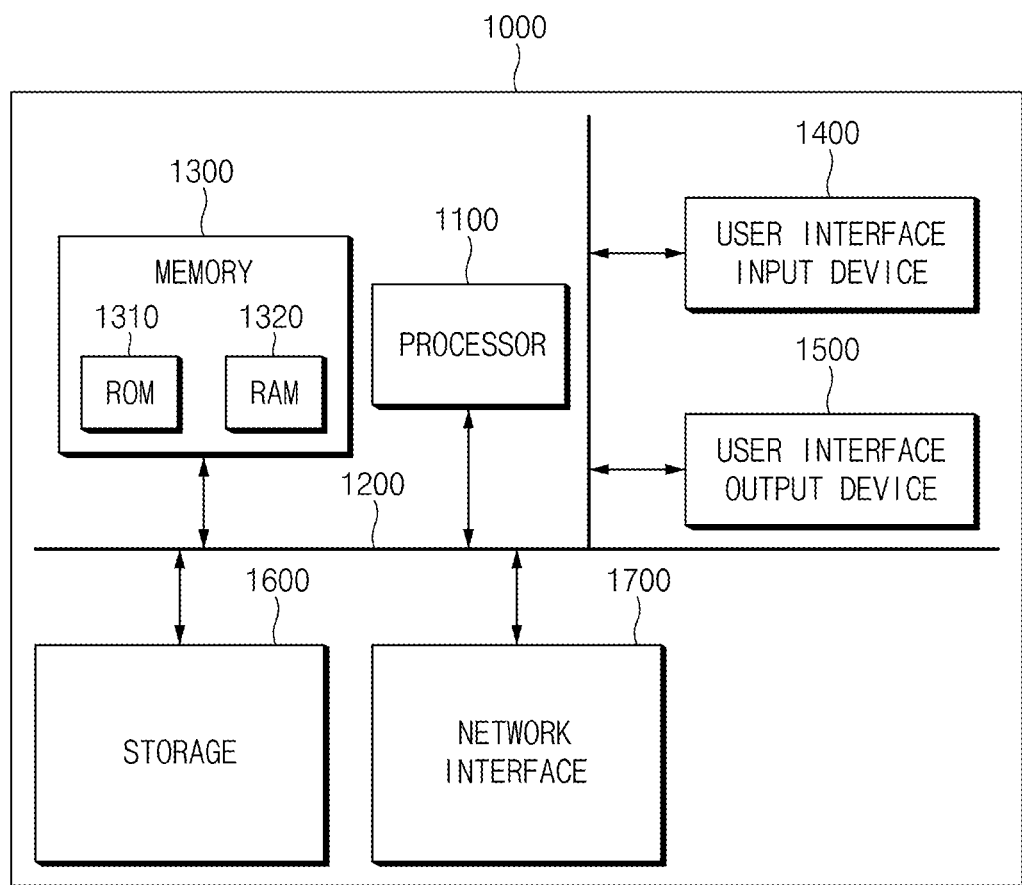
FIG. 8 illustrates a computing system according to various exemplary embodiments of the present invention.

In FIG. 8, an exemplary storage medium is coupled to the processor 1100, which can read information from and write information to the storage medium. Alternatively, the storage medium may be integrated with the processor 1100. The processor and the storage medium may reside within an application specific integrated circuit (ASIC). The ASIC may reside within a user terminal. Alternatively, the processor and the storage medium may reside as separate components within the user terminal.

The above description is merely illustrative of the technical idea of the present invention, and those skilled in the art to which various exemplary embodiments of the present invention pertains may make various modifications and variations without departing from the essential characteristics of the present invention.

Furthermore, the term related to a control device such as "controller", "control unit", "control device" or "control module", etc refers to a hardware device including a memory and a processor configured to execute one or more steps interpreted as an algorithm structure. The memory stores algorithm steps, and the processor executes the algorithm steps to perform one or more processes of a method in accordance with various exemplary embodiments of the present invention. The control device according to exemplary embodiments of the present invention may be implemented through a nonvolatile memory configured to store algorithms for controlling operation of various components of a vehicle or data about software commands for executing the algorithms, and a processor configured to perform operation to be described above using the data stored in the memory. The memory and the processor may be individual chips. Alternatively, the memory and the processor may be integrated in a single chip. The processor may be implemented as one or more processors. The processor may include various logic circuits and operation circuits, may process data according to a program provided from the memory, and may generate a control signal according to the processing result.

The control device may be at least one microprocessor operated by a predetermined program which may include a series of commands for carrying out the method included in the aforementioned various exemplary embodiments of the present invention.

The aforementioned invention can also be embodied as computer readable codes on a computer readable recording medium. The computer readable recording medium is any data storage device that can store data which may be thereafter read by a computer system. Examples of the computer readable recording medium include hard disk drive (HDD), solid state disk (SSD), silicon disk drive (SDD), read-only memory (ROM), random-access memory (RAM), CD-ROMs, magnetic tapes, floppy discs, optical data storage devices, etc and implementation as carrier waves (e.g., transmission over the Internet).

In various exemplary embodiments of the present invention, each operation described above may be performed by a control device, and the control device may be configured by a plurality of control devices, or an integrated single control device.

In various exemplary embodiments of the present invention, the control device may be implemented in a form of hardware or software, or may be implemented in a combination of hardware and software.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

What is claimed is:

1. A multi-functional light emitting diode (LED) lamp driving system comprising:
    a first light source group and a second light source group distinguished for each lamp function thereof;
    a single light-emitting diode (LED) lamp driving module configured to adjust an input voltage to a voltage required for each lamp function of the first light source group and the second light source group and to apply the input voltage to the first light source group and the second light source group;
    a switching module configured to control on or off of the first light source group and the second light source group; and
    a control module configured to control light amounts of the first light source group and the second light source group by performing time-division control on an on or off time of the switching module in conjunction with the LED lamp driving module,
    wherein the control module is configured to perform time division turn-on control on the first light source group and the second light source group by controlling at least one of a current value applied to the first light source group and the second light source group or a duty ratio of the first light source group and the second light source group in a high-beam passing mode in which a high-beam signal is inputted in a state where a daytime running lamp by the second light source group is turned on during a daytime,
    wherein the control module is further configured:
        to perform turn-on control on the second light source group at a first duty ratio in a daytime mode,
        to perform turn-on control on the first light source group at a second duty ratio which is smaller than the first duty ratio in a night mode, and
        to perform turn-on control on the second light source group at a third duty ratio which is equal to or smaller than a value obtained by subtracting the second duty ratio from the first duty ratio.

2. The multi-functional LED lamp driving system of claim 1,
    wherein the first light source group performs at least one of a low-beam function, a high-beam function, or a sub-high beam function, and
    wherein the second light source group performs a daytime running lamp (DRL) function or a positioning lamp function.

3. The multi-functional LED lamp driving system of claim 2,
    wherein the first light source group includes a first LED group, a second LED group, and a third LED group, to perform the low-beam function, the high-beam function, and the sub-high beam function, respectively, and
    wherein the first LED group, the second LED group, and the third LED group are connected in series.

4. The multi-functional LED lamp driving system of claim 2, wherein the control module is configured:
    to control the LED lamp driving module so that a first current value is applied to the second light source group in the daytime mode, and
    to control the LED lamp driving module so that a second current value which is greater than the first current value is applied to the first light source group in the night mode.

5. The multi-functional LED lamp driving system of claim 4,
    wherein the control module is configured to control the LED lamp driving module so that a third current value which is greater than the second current value is applied to the second light source group in the high-beam passing mode.

6. The multi-functional LED lamp driving system of claim 5,
    wherein the control module is configured to control the third current value not to exceed a maximum output current value or a limit current value of the light-emitting diode (LED) lamp driving module.

7. The multi-functional LED lamp driving system of claim 1,
    wherein the control module is configured to perform turn-on control on the first light source group and the second light source group at a same duty ratio, as a duty ratio in the night mode, in the high-beam passing mode.

8. The multi-functional LED lamp driving system of claim 1, wherein the control module is configured to perform turn-on control on the first light source group at a fourth duty ratio which is smaller than the second duty ratio in the high-beam passing mode, and to perform turn-on control on the second light source group at a fifth duty ratio which is equal to or smaller than a value obtained by subtracting the fourth duty ratio from the first duty ratio.

9. The multi-functional LED lamp driving system of claim 8,
    wherein the control module is configured to determine a current value applied to the first light source group in the high-beam passing mode and a fourth duty ratio thereof so that a current area using a current value applied to the first light source group in the night mode and the second duty ratio is similar to a current area in the high-beam passing mode within a predetermined range.

10. The multi-functional LED lamp driving system of claim 8,
wherein the control module is configured to determine a current value applied to the second light source group in the high-beam passing mode and a fifth duty ratio thereof so that a current area using a current value applied to the second light source group in the daytime mode and the first duty ratio is similar to a current area in the high-beam passing mode within a predetermined range.

11. The multi-functional LED lamp driving system of claim 8,
wherein the control module, when the current value applied to the second light source group exceeds a maximum output current value or a limit current value of the LED lamp driving module, is configured to control the current value applied to the second light source group not to exceed the maximum output current value or the limit current value of the LED lamp driving module by reducing a duty ratio of the first light source group compared to the duty ratio in the night mode and increasing a duty ratio of the second light source group.

12. The multi-functional LED lamp driving system of claim 8,
wherein the control module, when the current value applied to the second light source group does not exceed a maximum output current value or a limit current value of the LED lamp driving module, is configured to perform time division turn-on control on the first light source group and the second light source group by use of the duty ratio in the night mode and the current value applied to the second light source group that does not exceed the maximum output current value or the limit current value of the LED lamp driving module.

13. The multi-functional LED lamp driving system of claim 1, wherein the LED lamp driving module includes:
a first transistor, a second transistor, a third transistor and a fourth transistor connected in series;
an inductor connected between the second transistor and the third transistor in parallel; and
a resistor connected between the second transistor and the third transistor and grounded.

\* \* \* \* \*